Feb. 14, 1928.
G. C. THOMAS, JR
1,659,060
FIXTURE STUD
Filed May 10, 1926
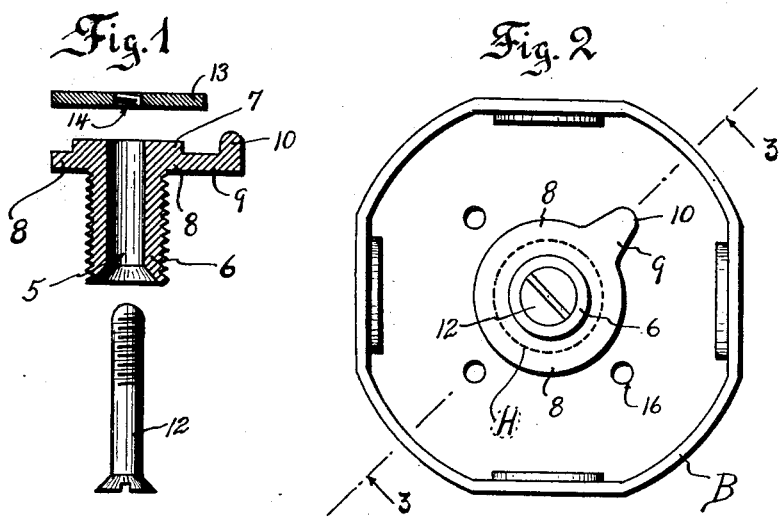
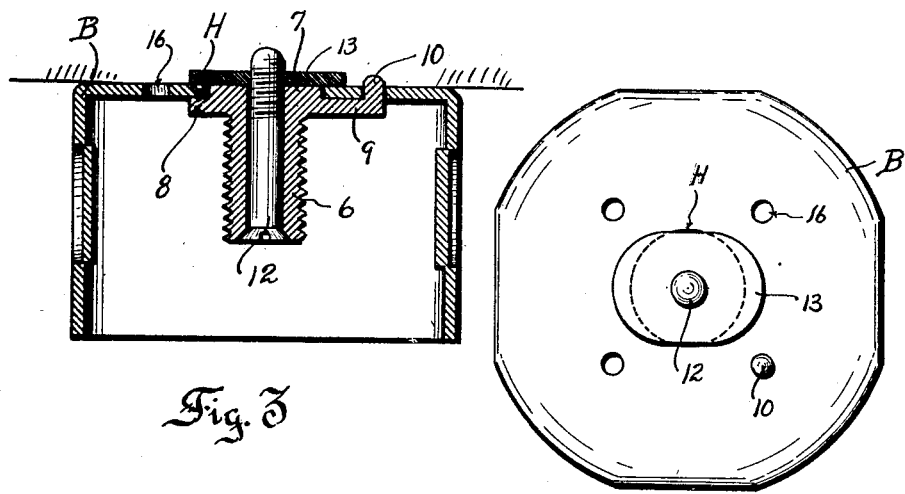
INVENTOR
George C. Thomas, Jr.
BY
Bobbbert Ledbetter
ATTORNEYS Patented Feb. 14, 1928.

1,659,060

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

FIXTURE STUD.

Application filed May 10, 1926. Serial No. 107,867.

This invention relates to fixture studs for use in connection with electrical outlet boxes and which are used for installing an electric light fixture to be suspended from the outlet box.

One of the main purposes of this invention is to produce a fixture stud capable of being anchored to the box by working from below and from inside the box so that the mechanic on the job may quickly and conveniently place the fixture stud in the box hole and anchor it therein after the box has been mounted on the ceiling.

It is also an object to produce a fixture stud capable of being anchored to a box without employing screws and which embodies a suspension plate anchor member capable of being introduced through the box hole and overlie or lap across the box hole edge on top of the box and on the outside thereof.

With the above and other objects in view, there is shown an example of the invention in the accompanying drawings wherein:

Figure 1 shows a longitudinal sectional view through the fixture stud with the parts in separate alignment ready to be brought together in assembled relation.

Figure 2 shows an inside plan view of a box with the fixture stud assembled therein.

Figure 3 shows a vertical longitudinal section of the box with the fixture stud anchored therein.

Figure 4 is a top or plan view of the box looking down from the outside thereof which shows the suspension plate anchor member overlying the edge of the box hole.

Referring further to the drawing, there is shown a fixture stud including a threaded sleeve 6 cored out or provided with the hole 5 through which the screw 12 may be passed. The sleeve 6 constitutes a support for electric fixtures to be suspended from an outlet box B, and is usually threaded for that purpose. The threaded sleeve 6 is surmounted by and integral with a box hole boss 7 carrying a flange, disk or abutment 8 integral with the sleeve between the boss 7 and sleeve 6. In other words the circular flange 8 or other abutment means is disposed between the boss 7 and fixture stud sleeve 6.

A locking reach arm 9 is integral with the fixture stud casting 6 and includes a centering boss 10 to engage a hole 16 in the box B to prevent the fixture stud from turning in the box when the lighting fixture is installed in service position. It is preferred that the abutment 8 carry the reach arm 9 and centering boss 10 since the latter two parts form in effect a part of the abutment means which is too large to pass through the box hole and rests positively on one side of the box wall.

The screw 12 passes through the sleeve 6 and threads into a suspension plate anchor member or plate nut 13. The elongated suspension plate or nut 13 may to advantage be made oblong having a major axis somewhat greater than the diameter of the outlet hole H in the box B while its minor axis is slightly less than the diameter of the hole H in the box. The plate nut 13 may therefore be inserted through the box hole H from below or from inside the box so as to overlie the box hole on the outside thereof. The plate nut 13 is provided with a threaded center hole 14 for the reception of the screw 12.

The fixture stud is therefore capable of being mounted in the box B by working entirely from below or from inside the box as will be seen. In inserting the fixture stud from the inside of the box, the screw 12 is passed through the sleeve 6 and screwed into the nut 13 until all three parts comprising the fixture stud structure are connected together. The screw 12 is rotated a short distance only into the suspension plate 13 which provides considerable clearance between said plate and top surface of the fixture stud box hole boss 7, and this clearance permits the mechanic to hook the suspension plate 13 through the box hole H, after which the screw 12 is run up tight to clamp the plate 13 down tight on the outside of the box.

The reach arm mounts the centering boss 7 out away from the fixture stud so that this boss reaches the smaller box hole 16 and projects through it to lock the fixture stud sleeve 6 against rotation in the box. It is significant that the disk or flange 8 covers the box hole H from the bottom and inside the box, and for this reason the box is closed regardless of the size of the suspension plate 13 mounted on the outside of the box. It is observed that the suspension plate 13 may not quite cover the box hole H from the outside since said plate may be smaller, as to one of its dimensions at least, than the box hole, but any exposed portion of the box hole edge left uncovered by the plate 13 is sealed by the flange 8.

When the screw 12 is tightened up, the box hole boss 7 and abutment 8 shoulders into the hole and against the outer rim surface thereof, and the parts 8 and 13 are clamped and drawn fast upon the box wall therebetween. In this way I provide a fixture stud comprising one part small enough to go through the box hole and another part too large therefor. The smaller part 13 carries the load of the electric fixture suspended from the box B while the boss 7 and abutment 8 braces the fixture stud in the box in a rigid position.

What I claim is:—

1. In combination with an outlet box having a hole to receive a fixture stud, a suspension member mounted on the outside and over said box hole and suitable in size to be inserted through the box hole from the inside of the box, a disk inside the box covering the hole and fitting against the inside box wall, a fixture support depending integrally from the disk, means included on the fixture stud reaching away therefrom projecting into another hole of the box from the inside to lock the fixture stud against rotation, and a screw passing through the fixture support and disk and through the box hole and screwed into the suspension member.

2. In combination with an outlet box having a hole to receive a fixture stud, an elongated plate mounted on the outside and over said hole; a fixture support mounted inside the box, including a flange overlying the box hole edge sealing said hole, including a box hole boss carried by the flange and fitting into the box hole, and including a fixture support depending from the flange and box hole boss; and a screw passing through the fixture support, flange, and box hole, and threaded into the elongated plate.

3. A fixture stud comprising, a threaded sleeve to which may be attached electric fixtures, an abutment integral with one end of the sleeve and larger than a standard outlet box hole and adapted to overlie a box hole inside a box, a box hole boss included on the abutment thereabove, an elongated nut capable of being passed through a box hole and overlie the hole on the outside of a box wall, and a screw mounted in the sleeve and threaded into the elongated nut drawing together said nut and the box hole boss.

4. A fixture stud comprising, a sleeve to support electric fixtures, a flange on one end of the sleeve somewhat larger than a standard outlet box hole and adapted to abut and overlie a box hole inside the box, a centering boss included on the flange and adapted to fit into another box hole from inside thereof, a nut capable of being passed through a box hole but overlie the hole on the outside of a box wall, and a screw mounted in the sleeve and threaded into the nut drawing together the nut and the flange against both sides of the box wall.

5. A fixture stud comprising, a fixture support sleeve, surmounted by a box hole boss, including a flange therebetween of larger diameter than that of the sleeve, and larger than the boss, also including an arm, on the outer end of which is formed a boss smaller than the first named boss, both bosses having parallel axis, a suspension member mounted on the box hole boss, and a screw passed through the sleeve and threaded into the suspension member.

6. A fixture stud comprising, a fixture support sleeve, surmounted by a box hole boss, including abutment means therebetween of larger diameter than that of the sleeve, and larger than the boss, also including an arm, on the outer end of which is formed a boss smaller than the first named boss, both bosses having parallel axis, an oblong plate having a threaded hole in the center thereof and mounted on the sleeve above the flange and box hole boss, and a screw passed through the sleeve and screwed into the plate.

7. In combination with a box having a hole to receive a fixture stud, of a suspension member of such size as will fit through the box hole and overlie the edge thereof on the other side, a fixture supporting sleeve including a boss on one end to register within the box hole, abutment means included on the sleeve resting against the box wall and on the side thereof opposite to that of the suspension member to anchor the fixture stud against lengthwise displacement in one direction, a screw passed through the sleeve and secured to the suspension member to draw together the abutment means and suspension member, and a centering boss carried on the fixture stud reaching out therefrom and fitting into another hole in the box wall to lock the sleeve against turning.

8. A fixture stud comprising, a support member adapted to carry an electric fixture to be suspended from an outlet box, including abutment means on one end of the support member which abutment is adapted to rest against one side of a box wall and too large to pass through a box hole, a suspension plate of such size as will pass through a box hole and overlie said hole on the other side of the box wall, a single screw anchoring together the abutment means and suspension plate, and means to lock the fixture stud against rotation.

In testimony whereof I affix my signature.

GEORGE C. THOMAS, Jr.